United States Patent Office.

GEORGE F. WILSON, OF EAST PROVIDENCE, AND CHARLES A. CATLIN, OF PROVIDENCE, RHODE ISLAND.

PREPARATION OF SODIUM PHOSPHATE FOR BAKING-POWDER.

SPECIFICATION forming part of Letters Patent No. 229,574, dated July 6, 1880.

Application filed February 27, 1879.

*To all whom it may concern:*

Be it known that we, GEORGE F. WILSON, of East Providence, and CHARLES A. CATLIN, of Providence, Rhode Island, have invented a new and useful Improvement in the Manufacture of Phosphate-of-Sodium Compounds or Cream-of-Tartar Substitutes, and their use in baking-powders, in bread-making and other arts, which improvement is fully set forth in the following specification.

The invention relates to the preparation of acid phosphate-of-sodium compounds or cream-of-tartar substitutes, and their use in baking-powders, in bread-making, and other arts.

The invention consists in an acid powder or cream-of-tartar substitute in which the active ingredient or acid phosphate is a compound of soda having excess of base over a dihydrogen sodic compound, and in which both the acid phosphate and the sulphate of lime present are hydrated; and it consists, also, in the process of forming said salt by means of the double decomposition of the hydrogen dicalcic phosphate with sodium sulphate, as hereinafter more fully set forth.

The method employed is somewhat varied, according to the quality of the article it is desired to produce, essentially the same materials and the same chemical reactions being used. In each quality the resulting active principle is the same—acid phosphate of soda; but in one we retain all the lime of the tricalcic phosphate from which the phosphoric acid is obtained; in another only a portion thereof, and in a third we get rid of it as far as possible.

For convenience we will describe the plan for producing the three qualities separately.

To obtain a product retaining all the lime of the tricalcic phosphate used in its preparation we proceed as follows: In a suitable tank, provided with an agitator and steam-coil or other means of heating the contents, we place a determined quantity of dilute oil of vitrol from which the lead has been removed—say two thousand four hundred and sixty-four pounds at 25° Baumé—set the agitator in motion, and apply heat. We now add gradually a quantity of powdered white bone-ash, sufficient to produce, when acted upon by the oil of vitriol, a dihydrogen calcic phosphate in solution—say about eight hundred pounds of the bone-ash. This mixture is kept in motion and at a boiling, or near boiling, temperature for from seven to ten hours, at which time, under ordinary circumstances, the decomposition will have been completed. We now add, in dry powder, or it may be in solution in water, sulphate of soda in quantity sufficient to replace the lime of the dihydrogen calcic phosphate with soda—say about one hundred and sixty-one pounds of anhydrous sulphate of soda—and continue the boiling and agitation of the mass for from seven to ten hours longer, when the double decomposition of the dihydrogen calcic phosphate and the sulphate of sodium will have taken place. The thick fluid or semi-fluid mass is now drawn off into crystallizing-vats, or better, onto a tight floor, and allowed to remain until the mass has set or assumed a pasty solid condition, when it is spread upon the floor or other convenient place to dry. When nearly dry the process of desiccation is completed in a current of dry air, heated or not, as the case may be. If heated a temperature greater than 120° Fahrenheit must be avoided.

Second. When it is desired to retain only a portion of the lime of the tricalcic phosphate we filter off the solution of hydrogen dicalcic phosphate obtained as before described, boil it in a porcelain-lined pot or other suitable vessel, and add the requisite amount of sodium sulphate thereto, continuing the boiling and agitation until the mass becomes homogeneous and has the appearance of boiled starch. The mass is then allowed to cool, starch is mixed therewith, and the mixture is exposed to the air and finally dried, as before explained. When dry the whole is reduced to an impalpable powder by crushing and bolting.

The quantity of starch employed is about two to two and one-half times the weight of the sodium sulphate used.

To produce a compound comparatively free from sulphate of lime we form the hydrogen dicalcic phosphate and decompose it with sodium sulphate, substantially as first described, filter the liquid and concentrate it to the crystallizing-point, mix the compound with starch, expose to the air, and pulverize the dried product.

In effecting the conversion of the tricalcic phosphate it is desirable sometimes to add to the oil of vitriol a solution of acid sodium phosphate, obtained by washing the separate sulphate in hot water, and to continue the boiling and agitation longer than indicated, so as to insure the entire conversion of the tricalcic salt.

In the three above-described methods of procedure it will appear that all are essentially one and the same process, depending upon the double reaction between the dihydrogen calcic phosphate and the alkaline sulphate, the liquid mass obtained being converted into a dry powder by exposure to the air and drying.

The resulting product, in any case, contains more or less sulphate of lime in a completely hydrated condition, and contains, as the active ingredient, a hydrated acid phosphate of sodium having an excess of base over a dihydrogen sodic phosphate.

The acid powder obtained is mixed with an alkaline carbonate or bicarbonate to form baking-powder, or it is used in connection therewith in making self-raising flour and in bread-making. It may also be used as substitute for cream of tartar for other culinary purposes.

We do not confine ourselves to the exact weights and proportions given, for they may be varied to a considerable extent without materially affecting the result; nor do we confine ourselves to following the steps of the process in the exact order here laid down—as, for instance, the sulphate may be added at the outset and the process of decomposition and substitution of bases proceed at the same time.

Having thus described our said invention, and the manner in which the same is or may be carried into effect, what we claim, and desire to secure by Letters Patent, is—

1. An acid powder or cream-of-tartar substitute in which the active ingredient is an acid sodium phosphate having an excess of base over a dihydrogen sodic phosphate, and in which both the acid phosphate and the sulphate of lime present are completely hydrated, substantially as described.

2. The process of making an acid powder or cream-of-tartar substitute having as the active ingredient an acid sodium phosphate by decomposing tricalcic phosphate with dilute oil of vitriol in the manner described, thereby forming in solution an acid phosphate with excess of base over a dihydrogen calcic phosphate, then effecting the double decomposition of said salt with sodium sulphate under agitation and heat, and converting the fluid or semi-fluid mass into a dry powder, substantially as described, so that in the resulting product both the acid phosphate and the sulphate of lime present are completely hydrated, as set forth.

In testimony whereof we have signed this specification in the presence of two subscribing witnesses.

GEO. F. WILSON.
CHAS. A. CATLIN.

Witnesses to Geo. F. Wilson's signature:
A. POLLOK,
E. A. DICK.

Witnesses to Chas. A. Catlin's signature:
PHILIP O'REILY,
G. M. CARPENTER, Jr.